United States Patent [19]
Faulk

[11] Patent Number: 5,894,412
[45] Date of Patent: Apr. 13, 1999

[54] SYSTEM WITH OPEN-LOOP DC-DC CONVERTER STAGE

[75] Inventor: Richard A. Faulk, Cypress, Tex.

[73] Assignee: Compaq Computer Corp., Houston, Tex.

[21] Appl. No.: 08/954,335

[22] Filed: Oct. 17, 1997

Related U.S. Application Data

[62] Division of application No. 08/777,846, Dec. 31, 1996.

[51] Int. Cl.⁶ ............................................ H02M 7/122
[52] U.S. Cl. .............................. 363/56; 363/132; 307/82
[58] Field of Search ......................... 363/17, 24, 22, 363/56, 132, 133; 307/18, 82

[56] References Cited

U.S. PATENT DOCUMENTS

| | | | |
|---|---|---|---|
| 3,490,027 | 1/1970 | Galetto et al. | 363/24 |
| 4,811,185 | 3/1989 | Cook et al. | 363/24 |
| 5,109,185 | 4/1992 | Ball | 323/207 |

Primary Examiner—Shawn Riley
Attorney, Agent, or Firm—Robert Groover; Jerald J. Gnuschke; Matthew S. Anderson

[57] ABSTRACT

Innovative systems and methods for advantageous use of a new isolated power converter topology, in which transformer isolation is provided by a very simple DC-DC converter operated in open-loop mode (with each switch running at a constant duty cycle of approximately 50%, to achieve an effective duty cycle of approximately 100%), and feedback or modulation is instead applied to a preconverter stage which also does power factor corrections. Since the isolation stage is operated at a constant duty cycle, distortion can be minimized and its efficiency can be fully optimized, with a simple circuit and small component count. Unlike a flyback converter, only a very small inductance is required. A simple control architecture is used with current control loop. The disclosed circuit tightly clamps the voltages on the switch and on the transformer, with no ringing nor overshoot.

13 Claims, 3 Drawing Sheets

SYSTEM WITH OPEN-LOOP DC-DC CONVERTER STAGE

This is a divisional of Pending Ser. No. 08/777,846, filed Dec. 31, 1996, now pending.

BACKGROUND AND SUMMARY OF THE INVENTION

The present invention relates to power converters, and particularly to "off-line" converters, i.e. power converters which are operated from an AC power-line (mains) supply.

Background: Isolation from Mains

Safety regulations (such as UL™ requirements in the United States) often require some isolation between the power supply mains and electronic equipment. In power supplies this is commonly achieved by including a transformer at some point. However, because the transformer normally operates at duty cycles below 50%, current and voltage waveforms are often distorted. This results in a condition where the rms (root-mean-square) value of current is much higher than the average value of current, i.e. current handling is inefficient. Switching too can degrade efficiency.

Many methods of mains isolation have been used in power converters; but essentially all break the conduction path and insert a transformer at some point where an AC voltage exists, and hence are subject to the foregoing disadvantages.

Typically the transformer is integrated into a power conversion stage in one of various known topologies (forward, flyback, half-bridge, etc.). The voltage ratio between the primary and secondary can be adjusted, in any of these topologies, by appropriate selection of the transformer's turns ratio and duty cycle. The rate of power transfer through the transformer is typically adjusted by varying the duty cycle of the switching ransistor(s) which control the drive applied to the primary.

The present application teaches that the conventional operation of the isolation stage is a source of inefficiency, which can be reduced as described below. The dissipation characteristics of the transformer shift as the duty cycle changes, so that optimization is impossible.

Background: Control of Power Converters

A power supply must of course be stable under changing load conditions. Moreover, if a power supply puts out significant overvoltages it may destroy components which are connected to it. However, magnetic components (particularly isolation transformers) will naturally exhibit some variation in output voltage when the load impedance changes. Some regulation is therefore required.

Power supplies normally use negative feedback, where the output voltage is monitored. (In some cases the output current may also be monitored.) Typically the error signal derived from monitoring the output voltage is used to control a pulse-width modulation (PWM) stage, which adjusts the duty cycle of the transistor(s) which modulate current through the primary of the isolation transformer.

Background: Bridge Converter Topologies

One class of useful power converter topologies is bridge topologies. In such topologies, a simple rectifier (diode ring plus filter) is followed by an active switching circuit, in which current through a transformer primary is switched alternately in two opposite directions. (One terminal of the primary may be tied to an intermediate node in the filter, or, in a "full bridge" configuration, both terminals may be switched oppositely.)

This provides AC drive into the transformer. The transformer may include various secondaries, at various turn ratios, to provide separate outputs at different voltages (or simply to provide multiple isolated outputs). Each secondary normally includes output diodes (for rectification), and an output filter to reduce ripple.

An advantage of this topology is that both halves of the B-H curve are used, generally resulting in smaller magnetics.

Background: Power-Factor Correction

If an AC voltage is applied to an ideal resistor, then the waveform of the current will exactly follow that of the applied voltage. By contrast, if an AC voltage is applied to a reactive load (such as a capacitor or an induction motor), the resulting current will be out of phase with the applied voltage. One simple way to describe this situation is in terms of "power factor": "power factor" is the ratio of current voltage to power. (For a pure resistor, the power factor is equal to one.)

For electric utilities, a power factor which is not equal to one means that the current required to provide each kilowatt, at a given voltage, is increased. Since many of the utility's costs are proportional to current rather than power, any degradation in power factor imposed by customer demands has an impact on the utility's profitability. Moreover, degradation in power factor can also affect the peak load capability. However, the net power factor seen by the utility is determined by the customers's loads, and cannot be directly controlled by the utility. Accordingly, various regulatory authorities have begun to impose some constraints on the power factors which can be drawn by various machines and appliances.

There has therefore been an increasing amount of work in circuits for power-factor correction. Many such circuits use a boost converter with average current control between the rectifier bridge and the input energy-storage capacitor. See generally, e.g., Redl et al., "Low-cost power-factor correction/line-harmonics reduction with current-clamped boost converter," *Proc. International Power Conversion Electronics* '95 at 261 (1995); Lin et al., "Single phase rectifier with high power factor in continuous and discontinuous conduction mode," 1 *Proc. IEEE International Symposium on Industrial Electronics (ISIE* '95) 421 (1995); Hiti et al., "Control of front-end three-phase boost rectifier," 2 *Proc. 1994 IEEE Applied Power Electronics Conf. (ASPEC'*94) at 927 (1994); Hua et al., "Development of a DC distributed power system," 2 *Proc. 1994 IEEE Applied Power Electronics Conf. (ASPEC'*94) at 763 (1994); Yang et al., "Isolated boost circuit for power factor correction," *Proc. IEEE Applied Power Electronics Conference (APEC* '93) 196 (1993); Martin et al., "Single-chip controller provides power factor correction for 350 W supply," *Powerconversion & Intelligent Motion*, vol.18, no. 10, at 15 (October 1992); Prasad et al., "An active power factor correction technique for three-phase diode rectifiers," 6 *IEEE Transactions on Power Electronics* 83 (1991); Kazerani et al., "Programmable input power factor correction methods for single phase diode rectifier circuits," *Proc. APEC* '90 177 (1990); Manias et al., "An AC-to-DC converter with improved input power factor and high power density," 22 *IEEE Transactions on Industry Applications* 1073 (1986); all of which are hereby incorporated by reference.

General Background

A wide variety of converter topologies have been proposed. See generally Pressman, SWITCHING POWER SUPPLY DESIGN (1991); the 3 volumes of Middlebrook and Ćuk, ADVANCES IN SWITCHED-MODE POWER CONVERSION (2.ed.1983); and all of the annual UNITRODE POWER SUPPLY DESIGN SEMINAR HANDBOOKS; all of which are hereby incorporated by reference. Other references for background in this and related areas include the following: Billings, SWITCHMODE POWER SUPPLY HANDBOOK (1989); Chetty, SWITCH-MODE POWER SUPPLY DESIGN (1986); Chryssis, HIGH FREQUENCY SWITCHING POWER SUPPLIES (2.ed. 1989); Flanagan, HANDBOOK OF TRANSFORMER DESIGN & APPLICATIONS (2.ed. 1993); Gottlieb, POWER SUPPLIES, SWITCHING REGULATORS, INVERTERS, AND CONVERTERS (2.ed. 1994); Hoft, SEMICONDUCTOR POWER ELECTRONICS (1986); Lenk, SIMPLIFIED DESIGN OF SWITCHING POWER SUPPLIES (1995); Mazda, POWER ELECTRONICS HANDBOOK (1990); Mohan et al., POWER ELECTRONICS (2.ed. 1995); Nasar, ELECTRIC MACHINES AND TRANSFORMERS (1984); Nave, POWER LINE FILTER DESIGN FOR SWITCHED-MODEPOWER SUPPLIES (1991); REACTIVE POWER: BASICS, PROBLEMS AND SOLUTIONS (ed.Sheble 1987); Severns and Bloom, MODERN DC-TO-DC SWITCHMODE POWER CONVERTER CIRCUITS (1984); Shepard, POWER SUPPLIES (1984); Sum, SWITCH MODE POWER CONVERSION (1988); Tihanyi, ELECTROMAGNETIC COMPATIBILITY IN POWER ELECTRONICS (1995); Williams, POWER ELECTRONICS (1987); Wood, SWITCHING POWER CONVERTERS (1981); the proceedings of the annual INTERNATIONAL H
IGH-FREQUENCY POWER CONVERSION conferences from 1986 to date; and the proceedings of the POWERCON and POWER ELECTRONICS SPECIALISTS conferences from 1980 to date. All of these books, and the references cited in them, are hereby incorporated by reference.

Innovative Power Converter

The present invention provides a power conversion method and system which operates the isolation transformer without regulation at a constant 50% duty cycle, to achieve an effective duty cycle performance of essentially 100%. This is referred to as a "transverter" since it acts like a DC-DC transformer, using power converter techniques. This transverter stage permits the efficiency of the transformer and switches to be completely optimized. This avoids inefficiency and distortion. Control and feedback are performed at other points in the circuit, e.g. in a preregulator stage which precedes the transverter. By isolating the control and feedback stages from the isolation transformer, essentially all waveform distortion due to the transformer can be avoided. Moreover, the transverter provides a building block for modular design strategies, and the transverter block can easily be combined with various correction circuits or output filters for various applications.

This is particularly advantageous in integrated power implementations, since power dissipation in the integrated switching transistors can be minimized. A further advantage is that selection of the transformer becomes far less critical. Moreover, the transformer will generally be greatly reduced in size.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
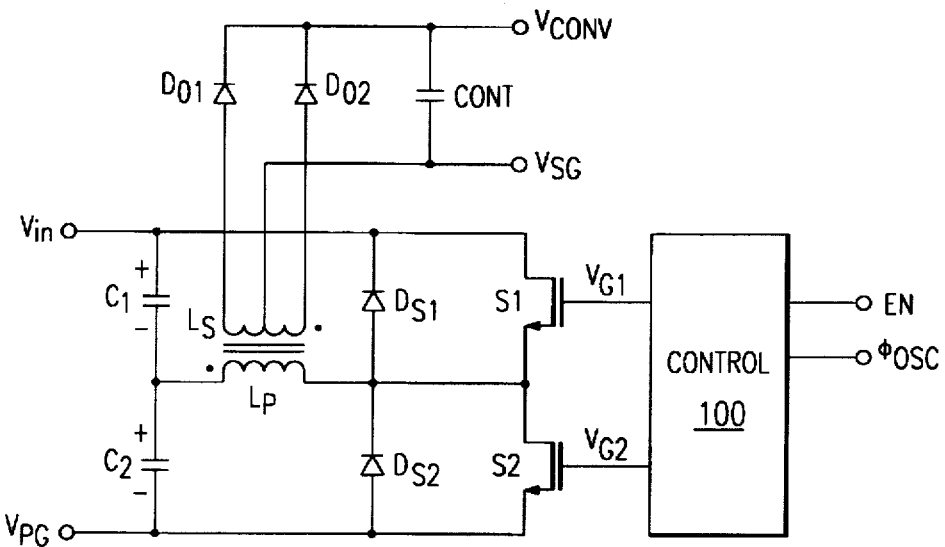
FIG. 1 shows a transverter (free-running isolated converter) in which the disclosed innovations are advantageously implemented.

The numerous innovative teachings of the present application will be described with particular reference to the presently preferred embodiment (by way of example, and not of limitation), in which:

FIG. 1 shows a half-bridge converter topology in which the disclosed innovations are advantageously implemented. One end of the primary winding $L_p$ is tied, through two capacitors $C_1$ and $C_2$, to the two input power connections $V_{in}$ and VPG (primary ground). The other end of primary $L_p$ is pulled alternately high and low by two switches $S_1$ and $S_2$. Preferably both switches are N-channel VDMOS transistors, with parasitic diodes $D_{S1}$ and $D_{S2}$ as shown.

The center-tapped secondary winding $L_s$ is connected through two output diodes $D_{o1}$ and $D_{o2}$ to provide a rectified output current into an output capacitor $C_{out}$. Output capacitor $C_{out}$ provides some degree of filtering, but of course additional output filtering can optionally be added.

Control logic 100 operates switches S1 and S2 in strict alternation, at an even 50% duty cycle (with a small delay between halfcycles). Note that an enable input EN is provided in this embodiment, to permit the transverter to return to a zero-power state, but no dynamic control of duty cycle is provided: unless the transverter is completely turned off it switches constantly at a fixed duty cycle. In the presently preferred embodiment the control logic is simply a ring counter which is clocked by an oscillator input $\phi_{osc}$, and provides true and complemented most-significant-bit outputs which are buffered to produce the gate drive outputs $V_{G1}$ and $V_{G2}$ to drive the two transistors. However, the functionality of this controller is extremely simple, and other circuit implementations (such as a 555 timer) can alternatively be used.

The switching frequency for a conventional 50 W bridge converter would typically be in the neighborhood of 300 KHz, to minimize magnetizing current; but using the disclosed configuration the optimum efficiency was actually achieved at 40 KHz. Magnetizing current is not harmful, since it transfers to the output at full load. Thus the disclosed configuration advantageously combines the small size of a 300 KHz transformer, with the high efficiency of a 40 KHz transformer.

For example, the disclosed configuration was demonstrated using a transformer size of 0.9"×0.9"×0.16" overall (including windings) to implement a 50 W converter which converted 400 V in to 40 V out with 94 % efficiency of 40 KHz. (This core achieves improved isolation with the methods of U.S. patent application Ser. No. 08/656967 filed Jun. 6, 1996 and now pending, which is hereby incorporated by reference.) By contrast, it is estimated that a conventional transformer size for this power level would require a volume of about one cubic inch (1.2"×1.2"×0.7").

Figure 1A:
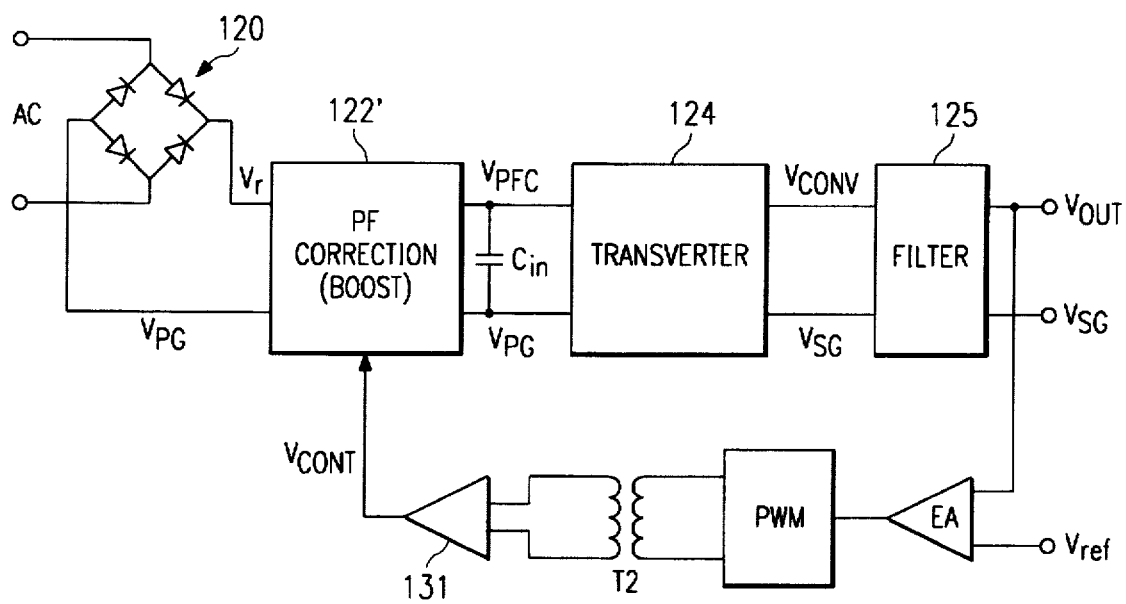
FIG. 1A shows one embodiment of a complete power supply incorporating the transverter circuit of FIG. 1.

FIG. 1A shows a complete power supply incorporating the transverter circuit 124 of FIG. 1. A full-wave-rectifier 120 is connected to an AC power line voltage (e.g. 120 V 60 Hz), and provides a rectified voltage $V_r$ and primary ground $V_{PG}$ therefrom. A PFC circuit 122' (which preferably a simple boost stage) provides power factor correction. This results in a power-factor-corrected output $V_{PFC}$, which is filtered in an input capacitor $C_{in}$ and applied to the input $V_{in}$ of the transverter stage 124. The transverter stage 124 provides a fully isolated output $V_{conv}$ and a secondary-side ground $V_{SG}$. Filter 125 smoothes and stabilizes the output voltage $V_{out}$, and an error amplifier EA monitors variations in the output voltage Vout (which may be caused by variations in the load impedance). A pulse-width modulation stage PWM accordingly generates pulse trains, which are coupled through a signal isolation transformer T2 and buffer 131, to provide a control input $V_{cont}$ to the PFC stage 122'.

Figure 1B:
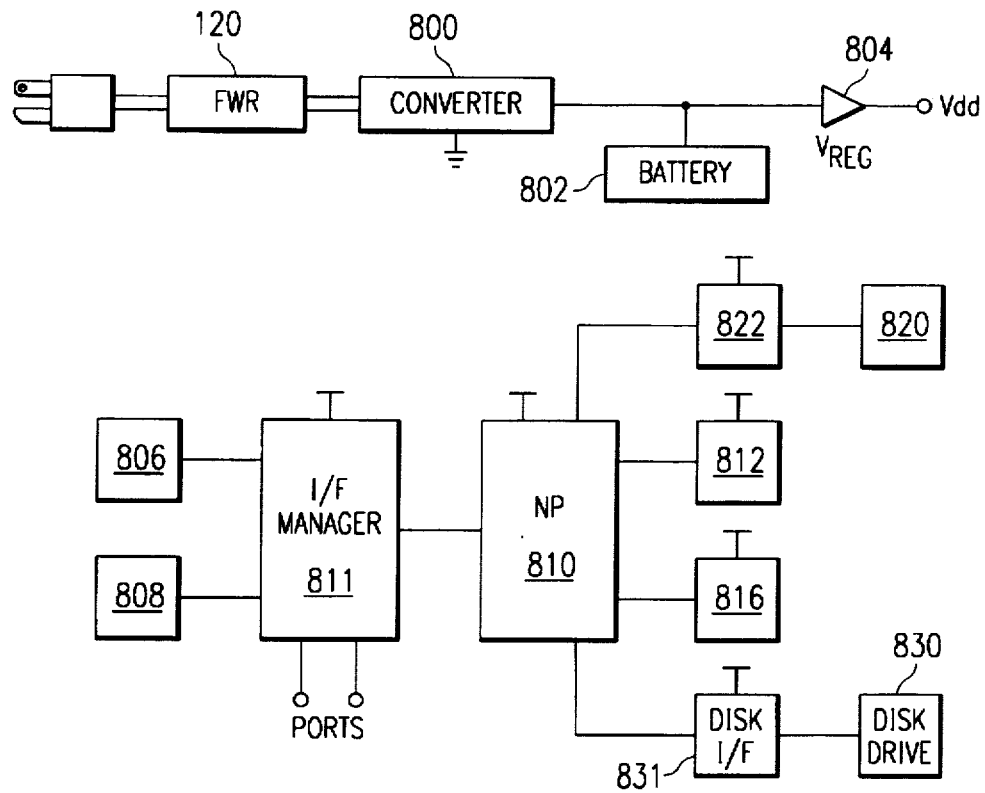
FIG. 1B shows a portable computer incorporating the power supply of FIG. 1A.

FIG. 1B shows a portable computer including a power converter 800 as in FIG. 1A (including PFC stage 122', transverter 124, filter 125, etc.), which is used to charge the battery 802. The power converter is connected, through a full-wave bridge rectifier 120, to draw power from AC mains, and is connected to provide a DC voltage to the battery. The battery 802 (or the converter 800), connected through a voltage regulator 804, is able to power the complete portable computer system, which includes, in this example: user input devices (e.g. keyboard 806 and mouse 808);

at least one microprocessor 810 which is operatively connected to receive inputs from said input device, through an interface manager chip 811 (which also provides an interface to the various ports);

a memory (e.g. flash memory 812 and RAM 816), which is accessible by the microprocessor;

a data output device (e.g. display 820 and display driver card 822) which is connected to output data generated by microprocessor; and a magnetic disk drive 830 which is read-write accessible, through an interface unit 831, by the microprocessor.

Optionally, of course, many other components can be included, and this configuration is not definitive by any means.

Figure 1C:
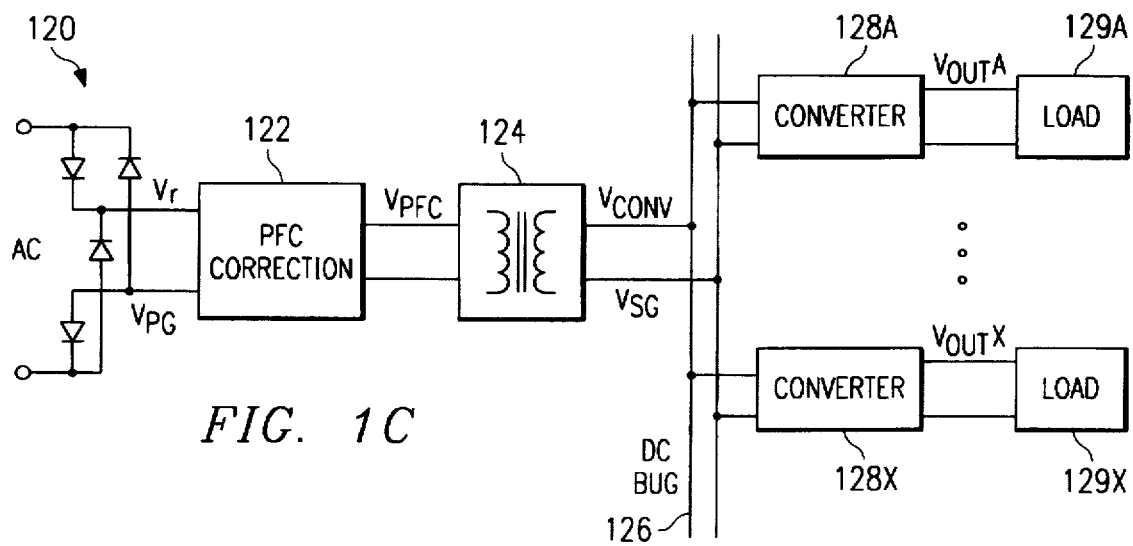
FIG. 1C shows another embodiment of a complete power supply incorporating the transverter circuit of FIG. 1.

FIG. 1C shows another embodiment of a complete power supply incorporating the transverter circuit 124 of FIG. 1. A full-wave-rectifier 120 is connected to an AC power line voltage (e.g. 120 V 60 Hz), and provides a rectified voltage $V_r$ and primary ground $V_{PG}$ therefrom. A PFC circuit 122 (which preferably a simple boost stage) provides power factor correction. (However, in this embodiment (unlike that of FIG. 1A), this stage operates without feedback from the output voltage.) This results in a power-factor-corrected output $V_{PFC}$, which is applied to the input $V_{in}$ of the transverter stage 124. The transverter stage 124 provides a fully isolated output $V_{conv}$ and a secondary-side ground $V_{SG}$, which drive a DC bus 126. Multiple independent secondary DC-DC converters 128A–128X provide regulated outputs to respective loads (or load connections) 129A–129X. In this embodiment negative feedback is used in each of the secondary DC-DC converters 128, but not in the PFC circuit 122 nor in the transverter 124.

Figure 2A:
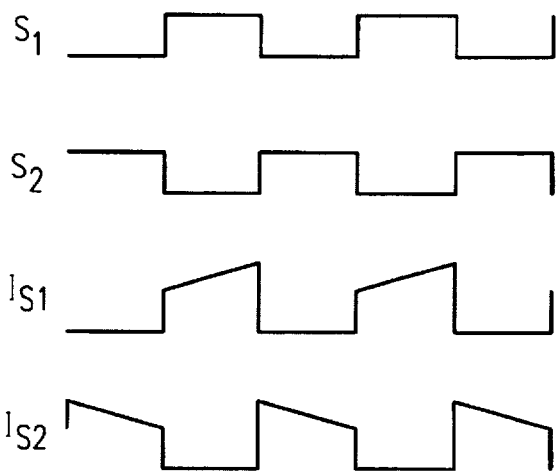
FIG. 2A shows time-domain waveforms of voltages and currents of the two switches of FIG. 1A.

FIG. 2A shows time-domain waveforms of voltages and currents in the circuit of FIG. 1. The top two lines show the control voltages on the two switches, and the next two lines show the current waveforms on the two switches.

Figure 2B:
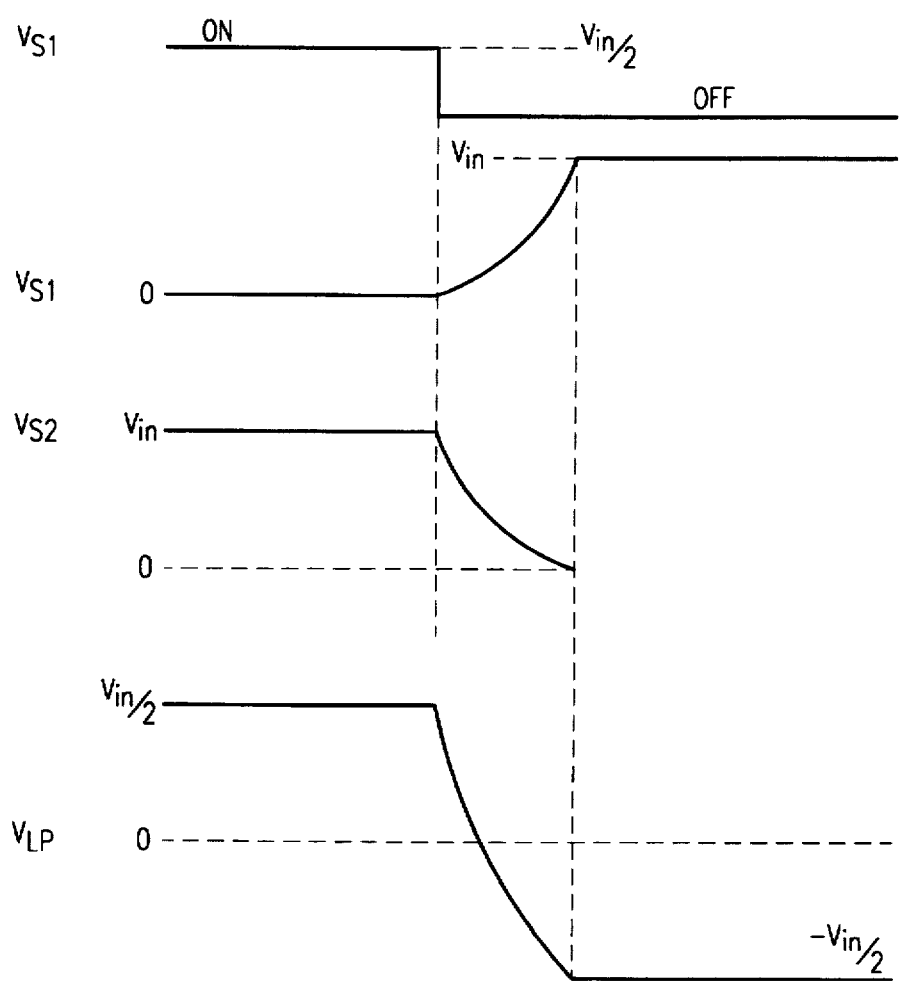
FIG. 2B shows an expanded-scale view of the transitions at the moment when S1 turns off.

FIG. 2B shows an expanded-scale view of the transitions at the moment when $S_1$ turns off. When S1 opens, the magnetizing inductance of the primary $L_p$ drives voltage on $S_1$ high, and the voltage on $S_2$ falls proportionately: $V_{S2}=V_{IN}-V_{S1}$. When the voltage in $S_1$ reaches $V_{IN}$, $V_{S2}$ has fallen to 0. Very shortly afterwards, $D_{S2}$ becomes forward biased and turns on. $L_p$ is now connected across $C_2$ and is now reverse biased. $S_2$ can now be closed with zero voltage across it. Thus the magnetizing currents now discharge quietly into the same voltage and time in which they were created.

Some advantages of this operation include:

Zero voltage switching has been accomplished.

Magnetizing currents transfer back and forth through $C_1$ and $C_2$ with no loss.

The switch voltages ($V_{S1}$, $V_{S2}$) are tightly clamped to the maximum value of $V_{IN}$, with no overshoot and virtually no power dissipation.

According to a disclosed class of innovative embodiments, there is provided: A power conversion method, comprising the steps of: (a.) operating switches alternately, to repeatedly drive current from power input connections through a primary winding in alternating directions; and (b.) rectifying and filtering an output current from a secondary winding which is isolated from and inductively coupled to said primary winding, to produce a converted power output; wherein said step (a.) is performed in an open-loop control relationship, without any direct or indirect feedback from said converted power output.

According to another disclosed class of innovative embodiments, there is provided: A power conversion method, comprising the steps of: (a.) operating switches alternately, to repeatedly drive current from power input connections through a primary winding in alternating directions; (b.) rectifying and filtering an output current from a secondary winding which is isolated from and inductively coupled to said primary winding, to produce a converted power output on a local bus; (c.) in a plurality of regulators, converting and regulating said converted power output to provide output power to a respective load connection, using negative feedback from a feedback connection which is operatively connected to said respective load connection, to stabilize said output power under changing load conditions; wherein said step (a.) is performed in an open-loop control relationship, without any feedback whatever from said converted power output nor from any of said load connections of said regulators.

According to another disclosed class of innovative embodiments, there is provided: A power conversion method, comprising the steps of: (a.) rectifying AC input power, to produce a rectified power output; (b.) operating a power-factor-correction circuit on said rectified power output, to produce a power-factor-corrected output; (c.) operating switches alternately, to repeatedly drive current from said power-factor-corrected output through a primary winding in alternating directions; and (d.) rectifying and filtering an output current from a secondary winding which is isolated from and inductively coupled to said primary winding, to produce a converted power output; wherein said step (c.) is performed in an open-loop control relationship, without any feedback whatever from said converted power output; and wherein said step (b.) is performed in a negative-feedback control relationship, with a feedback connection which is operatively connected to said converted power output, to stabilize said converted power output under changing load conditions.

According to another disclosed class of innovative embodiments, there is provided: A power supply subsystem, comprising: a primary winding having a first end connected to a first node which is operatively connected to a rectified input voltage through a first intermediate element and to a ground connection through a second intermediate element; a first switch connected to selectably drive a second end of said primary winding toward said rectified input voltage; and a second switch connected to selectably drive said second end of said primary winding toward said ground connection; a secondary winding which is isolated from and inductively coupled to said primary winding, and an output rectifier which full-wave-rectifies current from said secondary winding to produce a converted power output; and control circuitry which is connected to said first and second switches and turns on said switches alternately, in an open-loop control relationship, without any feedback whatever from said converted power output.

According to another disclosed class of innovative embodiments, there is provided: A power supply subsystem, comprising: an input rectifier stage, connected to receive AC input power and to produce a rectified power output therefrom; a power-factor-correction circuit connected to receive said rectified power output from said input rectifier stage and to produce a power-factor-corrected output therefrom; a primary winding having a first end connected to said power-factor-corrected output through a first capacitor, and to a ground connection through a second capacitor; a first switch connected to selectably drive a second end of said primary winding to said power-factor-corrected output; and a second switch connected to selectably drive said second end of said primary winding to said ground connection; a secondary winding which is isolated from and inductively coupled to said primary winding, and an output rectifier which full-wave-rectifies current from said secondary winding to produce a converted power output; control circuitry which is connected to said first and second switches and turns on said switches alternately, in an open-loop control relationship, without any feedback whatever from said converted power output; and wherein said power-factor-correction circuit is operatively connected to receive a feedback signal from said converted power output and to accordingly operate in a negative-feedback control relationship; whereby said converted power output is regulated under changing load conditions.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For one example, a full-bridge configuration, rather than a half-bridge, can be used to drive the transformer primary.

For another example, a voltage-boosting connection (like S1 in Pressman's FIG. 3.1) can be used to provide optional voltage-boosting in the primary (and hence capability for operating at both 120 V and 240 V).

For another example, the illustrated polarity of the diodes in the secondary rectification circuit can be reversed.

For another example, multiple secondaries can be used in place of the single secondary of the presently preferred embodiment.

For another example, more complex snubber networks can be used on the transistors.

For another example, a PMOS high-side driver configuration can also be used.

For another example, a current source can be used on the primary side (to ensure that current is always limited). This reduces the need for leakage inductance in the transformer.

For another example, a current source can be used on the secondary side.

For another example, the duty cycle can be adjusted slightly, depending on the characteristics of the switching transistors used, and does not have to be precisely 50%. However, the duty cycle should remain constant, i.e. should not be affected by transient changes in load conditions.

For another example, while the input and/or output filters have generally been shown as very simple one-stage circuits, it is of course possible to use a wide range of filter implementations, as is well known to those of ordinary skill in the art.

While the presently preferred embodiment has been described with reference to FET switching devices, the described innovations can also be adapted to circuits which use IGBTs, MCTs, bipolars, or other active devices for switching.

What is claimed is:

1. A power conversion method, comprising the steps of:
    (a.) operating switches alternately, to repeatedly drive current from power input connections through a primary winding in alternating directions;
    (b.) rectifying and filtering an output current from a secondary winding which is electrically isolated from and inductively coupled to said primary winding, to produce a converted power output on a local bus;
    (c.) in a plurality of regulators, converting and regulating said converted power output to provide output power to a respective load connection, using negative feedback from a feedback connection which is operatively connected to said respective load connection, to stabilize said output power under changing load conditions;
    wherein said step (a.) is performed in an open-loop control relationship, without any feedback whatever from said converted power output nor from any of said load connections of said regulators.

2. The method of claim 1, wherein two of said switches are operated alternately.

3. The method of claim 1, wherein each said switch is operated at a fixed duty cycle of approximately 50%.

4. The method of claim 1, wherein said step of operating switches alternately is performed substantially incessantly.

5. A power conversion method, comprising the steps of:
    (a.) rectifying AC input power, to produce a rectified power output;
    (b.) operating a power-factor-correction circuit on said rectified power output, to produce a power-factor-corrected output;
    (c.) operating switches alternately, to repeatedly drive current from said power-factor-corrected output through a primary winding in alternating directions; and
    (d.) rectifying and filtering an output current from a secondary winding which is isolated from and inductively coupled to said primary winding, to produce a converted power output;
    wherein said step (c.) is performed in an open-loop control relationship, without any feedback whatever from said converted power output;
    and wherein said step (b.) is performed in a negative-feedback control relationship, with a feedback connection which is operatively connected to said converted power output, to stabilize said converted power output under changing load conditions.

6. The method of claim 5, wherein said power-factor-correction circuit is also a boosting circuit.

7. The method of claim 5, wherein two of said switches are operated alternately.

8. The method of claim 5, wherein each said switch is operated at a fixed duty cycle of approximately 50%.

9. The method of claim 5, wherein said step of operating switches alternately is performed substantially incessantly.

10. A power supply subsystem, comprising:

an input rectifier stage, connected to receive AC input power and to produce a rectified power output therefrom;

a power-factor-correction circuit connected to receive said rectified power output from said input rectifier stage and to produce a power-factor-corrected output therefrom;

a primary winding having a first end connected to said power-factor-corrected output through a first capacitor, and to a ground connection through a second capacitor;

a first switch connected to selectably drive a second end of said primary winding to said power-factor-corrected output; and a second switch connected to selectably drive said second end of said primary winding to said ground connection;

a secondary winding which is isolated from and inductively coupled to said primary winding, and an output rectifier which full-wave-rectifies current from said secondary winding to produce a converted power output;

control circuitry which is connected to said first and second switches and turns on said switches alternately, in an open-loop control relationship, without any feedback whatever from said converted power output;

and wherein said power-factor-correction circuit is operatively connected to receive a feedback signal from said converted power output and to accordingly operate in a negative-feedback control relationship; whereby said converted power output is regulated under changing load conditions.

11. The subsystem of claim 10, wherein said power-factor-correction circuit is also a boosting circuit.

12. The subsystem of claim 10, wherein said control circuitry turns on each said switch at a fixed duty cycle of approximately 50%.

13. The subsystem of claim 10, wherein said control circuitry operates said switches substantially incessantly.

* * * * *